US012597443B2

(12) United States Patent
Agrawal et al.

(10) Patent No.: US 12,597,443 B2
(45) Date of Patent: Apr. 7, 2026

(54) DYNAMICALLY ADAPTING MEDIA PLAYBACK RATE

(71) Applicant: MOTOROLA MOBILITY LLC, Wilmington, DE (US)

(72) Inventors: Amit Kumar Agrawal, Bangalore (IN); Krishnan Raghavan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/784,627

(22) Filed: Jul. 25, 2024

(65) Prior Publication Data

US 2026/0031109 A1     Jan. 29, 2026

(51) Int. Cl.
| | |
|---|---|
| *G11B 27/00* | (2006.01) |
| *H04N 21/439* | (2011.01) |
| *H04N 21/44* | (2011.01) |
| *H04N 21/472* | (2011.01) |
| *H04N 21/475* | (2011.01) |

(52) U.S. Cl.
CPC ....... *G11B 27/005* (2013.01); *H04N 21/4394* (2013.01); *H04N 21/44008* (2013.01); *H04N 21/47217* (2013.01); *H04N 21/4755* (2013.01)

(58) Field of Classification Search
CPC ............. G11B 27/005; H04N 21/4394; H04N 21/44008; H04N 21/47217; H04N 21/4755
See application file for complete search history.

(56) References Cited

U.S. PATENT DOCUMENTS

| | | | | |
|---|---|---|---|---|
| 10,339,974 B1 * | 7/2019 | Luo | ........................ | G11B 27/28 |
| 2024/0355328 A1 * | 10/2024 | Sarana | .................... | G10L 15/26 |

* cited by examiner

*Primary Examiner* — Thai Q Tran
*Assistant Examiner* — Jose M Mesa
(74) *Attorney, Agent, or Firm* — Isidore PLLC

(57) ABSTRACT

A method provides techniques for dynamically adapting a media playback rate. A speaker analysis (SA) module operating on an electronic device is configured to cause the electronic device to obtain one or more playback preferences for a user. Audio data of recorded speech including spoken words is obtained and analyzed. The analysis can include determining a speech rate, accent, subject matter, genre, and/or other parameters pertaining to the spoken words. Based on the analysis, and user preferences, a recommended playback rate is computed, based at least in part on the playback rate preferences of a user and the one or more speech parameters. The playback rate can be automatically set to the recommended playback rate, and the media asset is rendered at the recommended playback rate.

20 Claims, 11 Drawing Sheets

1000

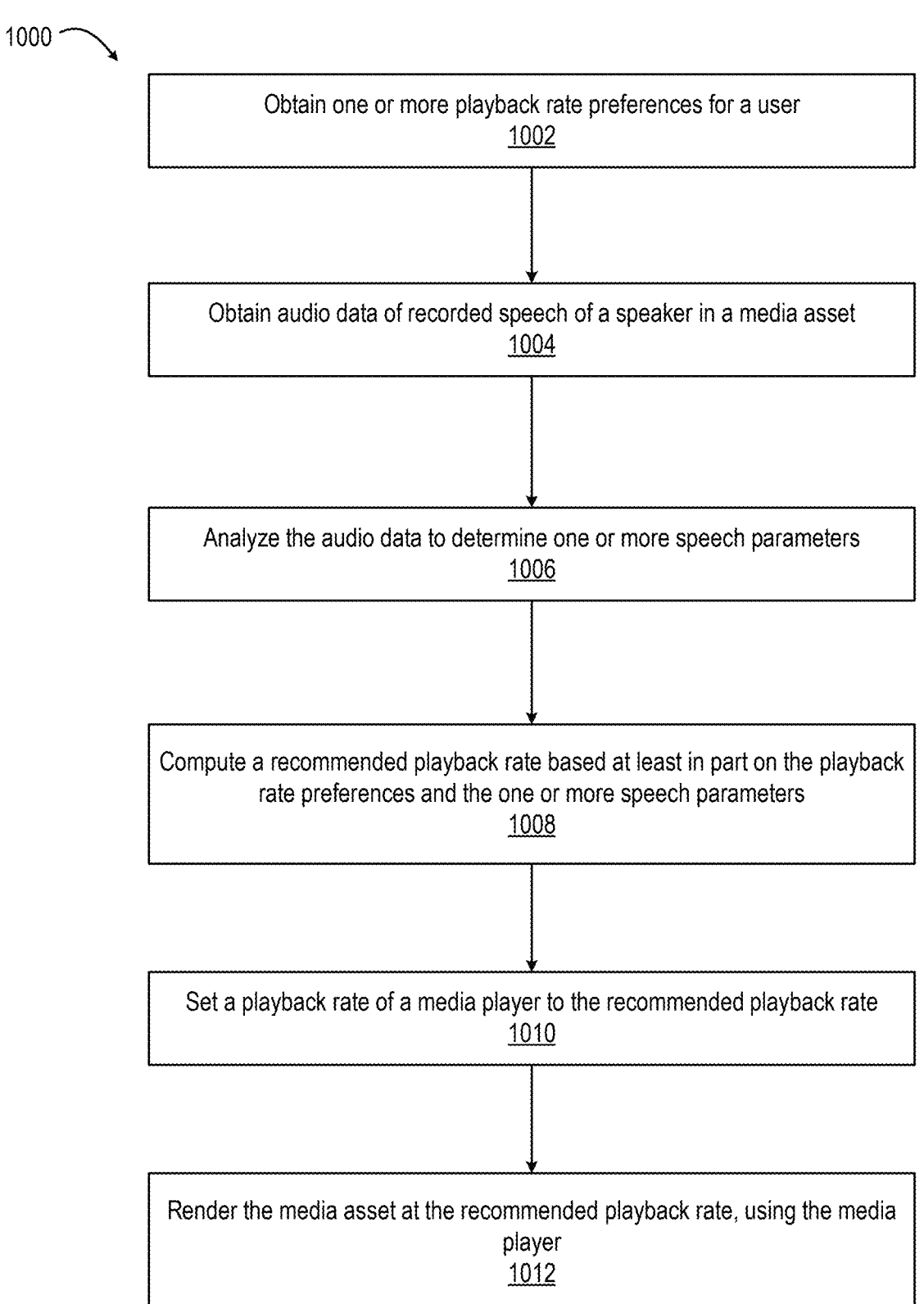

Obtain one or more playback rate preferences for a user
1002

Obtain audio data of recorded speech of a speaker in a media asset
1004

Analyze the audio data to determine one or more speech parameters
1006

Compute a recommended playback rate based at least in part on the playback rate preferences and the one or more speech parameters
1008

Set a playback rate of a media player to the recommended playback rate
1010

Render the media asset at the recommended playback rate, using the media player
1012

*FIG. 10*

DYNAMICALLY ADAPTING MEDIA PLAYBACK RATE

BACKGROUND

1. Technical Field

The present disclosure generally relates to electronic devices, and more specifically to electronic devices that enable playback of media.

2. Description of the Related Art

Video and audio consumption habits in modern society have evolved significantly due to advances in technology, increased internet accessibility, and the proliferation of smartphones and other portable devices. Streaming services such as Netflix, Amazon Prime Video, Disney+, Hulu, and YouTube are extremely popular. These services offer a vast library of content, including movies, TV shows, documentaries, and user-generated content. Short-form video platforms such as TikTok, Instagram Reels, and YouTube Shorts have popularized short, easily consumable video content. In addition to video, there are numerous audio platforms for consumption of audio-only content. The audio-only services can include services such as Spotify, Apple Music, Amazon Music, and YouTube Music, to name a few. In addition to music, the audio content can include podcasts that cover a wide range of topics, including news, education, storytelling, and niche interests. Moreover, audiobooks are becoming increasingly popular, and offer a convenient way to consume literature, especially for busy individuals.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 10 depicts a flowchart of a computer-implemented method for dynamically adapting a media playback rate, according to one or more embodiments.

DETAILED DESCRIPTION

Figure 1:
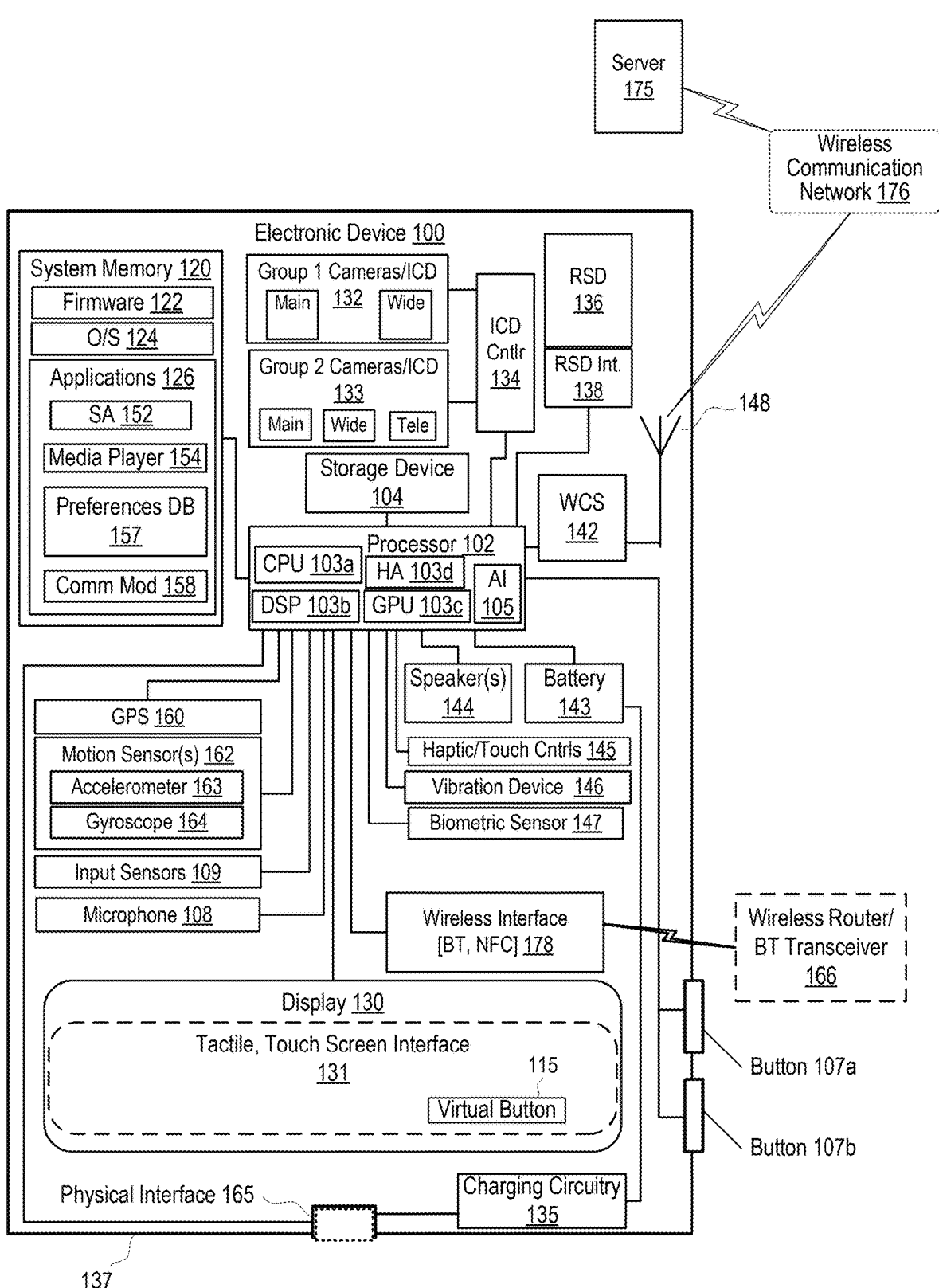
FIG. 1 depicts an example component makeup of an electronic device with specific components that enable the device to dynamically adapt a media playback rate, according to one or more embodiments.

According to aspects of the present disclosure, an electronic device, a method, and a computer program product provide techniques for dynamically adapting a media playback rate. A speaker analysis (SA) module operating on an electronic device is configured to cause the electronic device to obtain one or more playback preferences for a user. The playback preferences can include a preferred playback speed based on criteria such as a particular channel or source of media, a genre or subject for the media, a detected speech rate of spoken words in the media, and/or other criteria. Audio data of recorded speech that includes spoken words is obtained and analyzed. The analysis can include determining a speech rate, accent, language, subject matter, genre, and/or other parameters pertaining to the spoken words. A recommended playback rate is computed, based on the analysis and, at least in part, on the playback rate preferences of a user and the one or more speech parameters. The playback rate can be automatically set to the recommended playback rate, and the media asset is rendered at the recommended playback rate.

Non-native speakers often face several challenges when trying to comprehend audio and video content, particularly in the context of educational materials in complicated subjects. These challenges can significantly impact their ability to learn and retain information. Limited language proficiency can make it difficult to understand specialized terminology and jargon commonly used in complex subjects. Variations in grammatical structures between the native and target languages can lead to confusion and misunderstanding. Different accents and regional variations in pronunciation can make comprehension challenging, even if the non-native speaker is familiar with standard versions of the language. Moreover, native speakers often talk quickly, making it hard for non-native speakers to catch every word or phrase. Non-native speakers must simultaneously decode the language, understand the content, and apply their knowledge, which increases cognitive load and can lead to quicker fatigue and decreased comprehension. For media used for educational purposes, complicated subjects often involve technical terms and concepts that may not have direct translations in the non-native speaker's language. Understanding abstract or theoretical concepts can be particularly challenging without a strong grasp of the language.

In addition to language issues, there are various issues with educational material that can occur, even when non-native language is not at issue. For example, in the context of listening to recorded lectures, one major problem is the inconsistency in the pace of different teachers' lectures. Some instructors speak too slowly, making it tedious to follow, while others speak too quickly, making it difficult to grasp the content effectively. While media players may provide playback speed control features, users have to manually adjust the playback rate every time they switch to a lecture from a different teacher. This manual intervention can be time-consuming and frustrating.

The disclosed embodiments alleviate the aforementioned issues that can occur when a user attempts to consume audio and/or video content. One or more embodiments determine user preferences for A/V (audio and/or video) content consumption, based on criteria such as speech rate, subject matter, genre, accent, and/or other criteria. When a user selects a video for consumption, the spoken speech within the A/V asset is analyzed, and a recommended playback speed is determined, based on the analysis and the user preferences. By addressing these challenges and implementing techniques for dynamically adapting a media playback rate, disclosed embodiments can make audio and video content more accessible and effective for content consumers, enhancing their comprehension of the content, leading to improved entertainment and educational experiences.

One or more embodiments can include an electronic device including: at least one output device, including a display and an audio output device; a memory having stored thereon a speaker analysis (SA) module and a multimedia playback module; and at least one processor communicatively coupled to the display and the memory, the at least one processor executing program code of the SA module and multimedia playback module, and is configured to cause the electronic device to: obtain one or more playback rate preferences for a user; obtain audio data of recorded speech of a speaker in a media asset; analyze the audio data to determine one or more speech parameters; compute a recommended playback rate, based at least in part on the playback rate preferences and the one or more speech parameters; set a playback rate of a media player to the recommended playback rate; and render the media asset at the recommended playback rate, using the media player.

The above descriptions contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor(s) of the communication/electronic devices are also described as features and functions provided by a plurality of corresponding methods and computer program products, within the various different embodiments presented herein. In the embodiments presented as computer program products, the computer program product includes a non-transitory computer readable storage device having program instructions or code stored thereon, and configuring the electronic device and/or host electronic device to complete the functionality of a respective one of the above-described processes when the program instructions or code are processed by at least one processor of the corresponding electronic/communication device, such as is described above.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure. Throughout this disclosure, the terms 'electronic device', 'communication device', and 'electronic communication device' may be used interchangeably, and may refer to devices such as smartphones, tablet computers, and/or other computing/communication devices.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1, there is illustrated an example component makeup of electronic device 100, within which various aspects of the disclosure can be implemented, according to one or more embodiments. Electronic device 100 includes specific components that enable the device to provide dynamic media playback speed adjustment functions, according to one or more embodiments. Examples of electronic device 100 include, but are not limited to, mobile devices, a notebook computer, a mobile phone, a smart phone, a television, a smart watch, a tablet computer, an MPEG audio player, and other types of electronic device.

Electronic device 100 includes processor 102 (typically as a part of a processor integrated circuit (IC) chip), which includes processor resources such as central processing unit (CPU) 103a, communication signal processing resources such as digital signal processor (DSP) 103b, graphics processing unit (GPU) 103c, and hardware acceleration (HA) unit 103d. In some embodiments, the hardware acceleration (HA) unit 103d may establish direct memory access (DMA) sessions to route network traffic to various elements within electronic device 100 without direct involvement from processor 102 and/or operating system 124. Processor 102 can interchangeably be referred to as controller 102.

Processor 102 can, in some embodiments, include image signal processors (ISPs) (not shown) and dedicated artificial intelligence (AI) engines 105. In one or more embodiments, processor 102 can execute AI modules to provide AI functionality of AI engines 105. AI modules may include an artificial neural network, a decision tree, a support vector machine, Hidden Markov model, linear regression, logistic regression, Bayesian networks, and so forth. The AI modules can be individually trained to perform specific tasks and can be arranged in different sets of AI modules to generate different types of output. Processor 102 is communicatively coupled to storage device 104, system memory 120, image capture device (ICD) controller 134, input devices (introduced below), and output devices, including integrated display 130 and audio output device or speakers 144, and vibration device 146.

Throughout the disclosure, the term ICD is utilized interchangeably to be synonymous with cameras 132, 133, which includes front ICDs 132 and rear ICDs 133. ICDs or cameras 132, 133 include image sensors that can capture images that are within the field of view (FOV) of the respective camera

132, 133. ICD controller 134 can perform image acquisition functions in response to commands received from processor 102 in order to control front ICDs 132 and rear/back ICDs 133 to capture video or still images of a local scene within a FOV of the operating/active ICD.

Input devices can include microphone 108, input sensors 109 (e.g., sensors enabling gesture detection by a user), and one or more input buttons, indicated as 107a and 107b. While two buttons are shown in FIG. 1, other embodiments may have more or fewer input buttons. Microphone 108 can also be referred to as an audio input device. In some embodiments, microphone 108 may be used for identifying a user via voiceprint, voice recognition, and/or other suitable techniques. Input buttons 107a and 107b may provide controls for volume, power, and ICDs 132, 133.

In one or more embodiments, the functionality of ICD controller 134 is incorporated within processor 102, eliminating the need for a separate ICD controller. Thus, for simplicity in describing the features presented herein, the various camera selection, activation, and configuration functions performed by the ICD controller 134 are described as being provided generally by processor 102. Similarly, manipulation of captured images and videos are typically performed by GPU 103c and certain aspects of device communication via wireless networks are performed by DSP 103b, with support from CPU 103a. However, for simplicity in describing the features of the electronic device 100, the functionality provided by one or more of CPU 103a, DSP 103b, GPU 103c, and ICD controller 134 are collectively described as being performed by processor 102. Collectively, components integrated within processor 102 support computing, classifying, processing, transmitting and receiving of data and information, and presenting of graphical images within display 130 and outputting of audio content on audio output device (speakers) 144.

System memory 120 may be a combination of volatile and non-volatile memory, such as random-access memory (RAM) and read-only memory (ROM). System memory 120 can store program code or similar data associated with firmware 122, an operating system 124, and/or applications 126. During device operation, processor 102 processes program code of the various applications, modules, OS, and firmware, that are stored in system memory 120.

In accordance with one or more embodiments, applications 126 include, without limitation, speaker analysis (SA) module 152, media player 154, preferences database 157, and communication module 158. Other applications may also be present. Each module and/or application provides program instructions/code that are processed by processor 102 to cause processor 102 and/or other components of electronic device 100 to perform specific operations, as described herein. Descriptive names assigned to these modules add no functionality and are provided solely to identify the underlying features performed by processing the different modules. For example, SA module 152 can include program instructions for implementing features of disclosed embodiments. Media player 154 can include program instructions for managing the playback of audio and/or video assets in a variety of formats. In one or more embodiments, there can be multiple media players resident in the memory 120. Applications (e.g., YouTube, Spotify, etc.) can have their own media player integrated into the application. Moreover, media players can be included in a browser, as part of the browser, or as a plugin. Browser-based applications can use a media player that is integrated into a browser for playback of media. Preferences database 157 can store information about user preferences for consumption of media assets. The information can include, but is not limited to, preferred playback speed for a media asset based on speech rate, accent, subject matter, genre, media source, and/or other criteria.

In one or more embodiments, electronic device 100 includes removable storage device (RSD) 136, which is inserted into RSD interface 138 that is communicatively coupled via system interlink to processor 102. In one or more embodiments, RSD 136 is a non-transitory computer program product or computer readable storage device encoded with program code and corresponding data, and RSD 136 can be interchangeably referred to as a non-transitory computer program product. RSD 136 may have a version of one or more applications stored thereon. Processor 102 can access RSD 136 to provision electronic device 100 with program code that, when executed/processed by processor 102, the program code causes or configures processor 102 and/or generally electronic device 100, to provide the various functions described herein.

Electronic device 100 includes an integrated display 130 which incorporates a tactile, touch screen interface 131 that can receive user tactile/touch input. As a touch screen device, integrated display 130 allows a user to provide input to or to control electronic device 100 by touching features within the user interface presented on display 130. Tactile, touch screen interface 131 can be utilized as an input device. The touch screen interface 131 can include one or more virtual buttons, indicated generally as 115. In one or more embodiments, when a user applies a finger on the touch screen interface 131 in the region demarked by the virtual button 115, the touch of the region causes the processor 102 to execute code to implement a function associated with the virtual button. In some implementations, integrated display 130 is integrated into a front surface of electronic device 100 along with front ICDs, while the higher quality ICDs are located on a rear surface. In other embodiments, multiple of integrated display 130 are provided, including both a front and a rear display, for example, Electronic device 100 further includes haptic touch controls 145, vibration device 146, fingerprint/biometric sensor 147, global positioning system (GPS) module 160, and motion sensor(s) 162. Vibration device 146 can cause electronic device 100 to vibrate or shake when activated. Vibration device 146 can be activated during an incoming call or message in order to provide an alert or notification to a user of electronic device 100. According to one aspect of the disclosure, integrated display 130, speakers 144, and vibration device 146 can generally and collectively be referred to as output devices.

Biometric sensor 147 can be used to read/receive biometric data, such as fingerprints, to identify or authenticate a user. In some embodiments, the biometric sensor 147 can supplement an ICD (camera) for user detection/identification.

GPS module 160 can provide time data and location data about the physical location of electronic device 100 using geospatial input received from GPS satellites. Motion sensor(s) 162 can include one or more accelerometers 163 and gyroscope 164. Motion sensor(s) 162 can detect movement of electronic device 100 and provide motion data to processor 102 indicating the spatial orientation and movement of electronic device 100. Accelerometers 163 measure linear acceleration of movement of electronic device 100 in multiple axes (X, Y and Z). Gyroscope 164 measures rotation or angular rotational velocity of electronic device 100. Electronic device 100 further includes a housing 137 (generally represented by the thick exterior rectangle) that contains/ protects the components internal to electronic device 100 and defines the front, back, and sides of electronic device.

Electronic device 100 also includes a physical interface 165. Physical interface 165 of electronic device 100 can serve as a data port and can be used as a power supply port that is coupled to charging circuitry 135 and device battery 143 to enable recharging of device battery 143 and/or powering of device.

Electronic device 100 further includes wireless communication subsystem (WCS) 142, which can represent one or more front end devices (not shown) that are each coupled to one or more antennas 148. In one or more embodiments, WCS 142 can include a communication module with one or more baseband processors or digital signal processors, one or more modems, and a radio frequency (RF) front end having one or more transmitters and one or more receivers. Example communication module 158 within system memory 120 enables electronic device 100 to communicate with wireless communication network 176 and with other devices, such as server 175 and other connected devices, via one or more of data, audio, text, and video communications. Communication module 158 can support various communication sessions by electronic device 100, such as audio communication sessions, video communication sessions, text communication sessions, exchange of data, and/or a combined audio/text/video/data communication session.

WCS 142 and antennas 148 allow electronic device 100 to communicate wirelessly with wireless communication network 176 via transmissions of communication signals to and from network communication devices, such as base stations or cellular nodes, of wireless communication network 176. Wireless communication network 176 further allows electronic device 100 to wirelessly communicate with server 175, and other communication devices, which can be similarly connected to wireless communication network 176. In one or more embodiments, various functions that are being performed on communications device 100 can be supported using or completed via/on server 175. In one or more embodiments, server 175 can store audio and/or video assets that can be streamed to the electronic device 100.

Electronic device 100 can also wirelessly communicate, via wireless interface(s) 178, with wireless communication network 176 via communication signals transmitted by short range communication device(s). Wireless interface(s) 178 can be a short-range wireless communication component providing Bluetooth, near field communication (NFC), and/or wireless fidelity (Wi-Fi) connections. In one or more embodiments, electronic device 100 can receive Internet or Wi-Fi based calls, text messages, multimedia messages, and other notifications via wireless interface(s) 178. In one or more embodiments, electronic device 100 can communicate wirelessly with external wireless device 166, such as a WiFi router or BT transceiver, via wireless interface(s) 178. In one or more embodiments, WCS 142 with antenna(s) 148 and wireless interface(s) 178 collectively provide wireless communication interface(s) of electronic device 100.

Electronic device 100 of FIG. 1 is only a specific example of a device that can be used to implement the embodiments of the present disclosure. Devices that utilize aspects of the disclosed embodiments can include, but are not limited to, a smartphone, a tablet computer, a laptop computer, a desktop computer, a television, a wearable computer, and/or other suitable electronic device.

Figure 2:
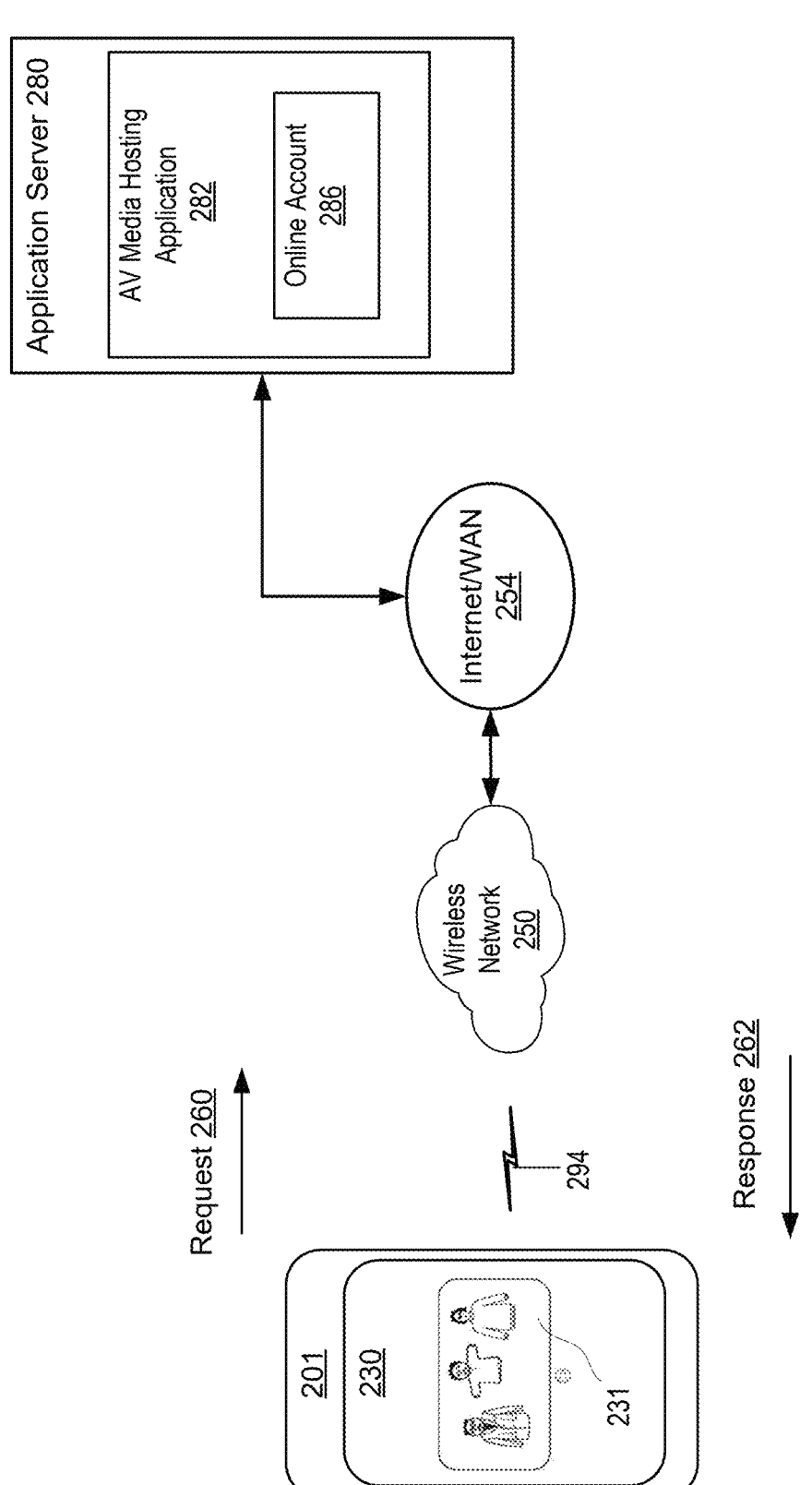
FIG. 2 is an example illustration of an electronic device transmitting a request for media playback of content hosted at a remote application server, according to one or more embodiments.

FIG. 2 is an example illustration of an electronic device transmitting a request to an application server 280 to initiate playback of a media asset, according to one or more embodiments. Device 201 includes a display 230 on which a media asset 231 is rendered. Device 201 can be an implementation of electronic device 100, having similar components and/or functionality. In one or more embodiments, at least some of the dynamic media playback rate functions may be implemented on a network-accessible application server, such as indicated by application server 280. Application server 280 is communicatively coupled to Internet/WAN 254. In one or more embodiments, Internet/WAN 254 can include one or more wide area networks (WANs) and/or the Internet. In one or more embodiments, electronic device 201 can communicate wirelessly with wireless network 250 via transmissions of communication signals 294 to and from network communication devices, such as base stations or cellular nodes, that can include components of network 250. Network 250 enables exchange of data between electronic device 201 and application server 280, via Internet/WAN 254.

Application server 280 can host AV media hosting application 282. The AV media hosting application 282 can support streaming and/or download of media assets to electronic device 201. In one or more embodiments, the application server 280 and/or the AV media hosting application 282 can provide the functionality of storing user preferences in online account 286, including preferences for a preferred playback speed, based on criteria such as genre, subject matter, speech rate, media source, and/or other criteria. The application server 280 and electronic device 201 may communicate with each other via Internet/WAN 254. In one or more embodiments, the application server 280 and electronic device 201 may communicate using one or more protocols, including, but not limited to, HTTP Live Streaming (HLS), and/or Dynamic Adaptive Streaming over HTTP (MPEG-DASH). These formats support adaptive bitrate streaming, which adjusts the quality of the video stream in real-time based on network conditions. Additionally, protocols such as RTSP (Real-Time Streaming Protocol) may be used for controlling various aspects of media playback. In one or more embodiments, the request 260 and response 262 may utilize Hypertext Transfer Protocol (HTTP) and/or its secure counterpart HTTPS. Embodiments may use RESTful APIs, JavaScript Object Notation (JSON), Simple Object Access Protocol (SOAP), and/or other communication techniques for exchanging information.

In one or more embodiments, in order to support scalability and/or case of maintenance, application server 280 may be implemented via virtualization, such as utilizing hypervisors like VMware, Hyper-V, or KVM. One or more embodiments may include containerization services such as docker, LXC, or other suitable container framework to enable multiple isolated user-space instances. Additionally, one or more embodiments may include load balancing and/or orchestration, such as utilizing Kubernetes, or other suitable orchestration framework.

Figure 3:
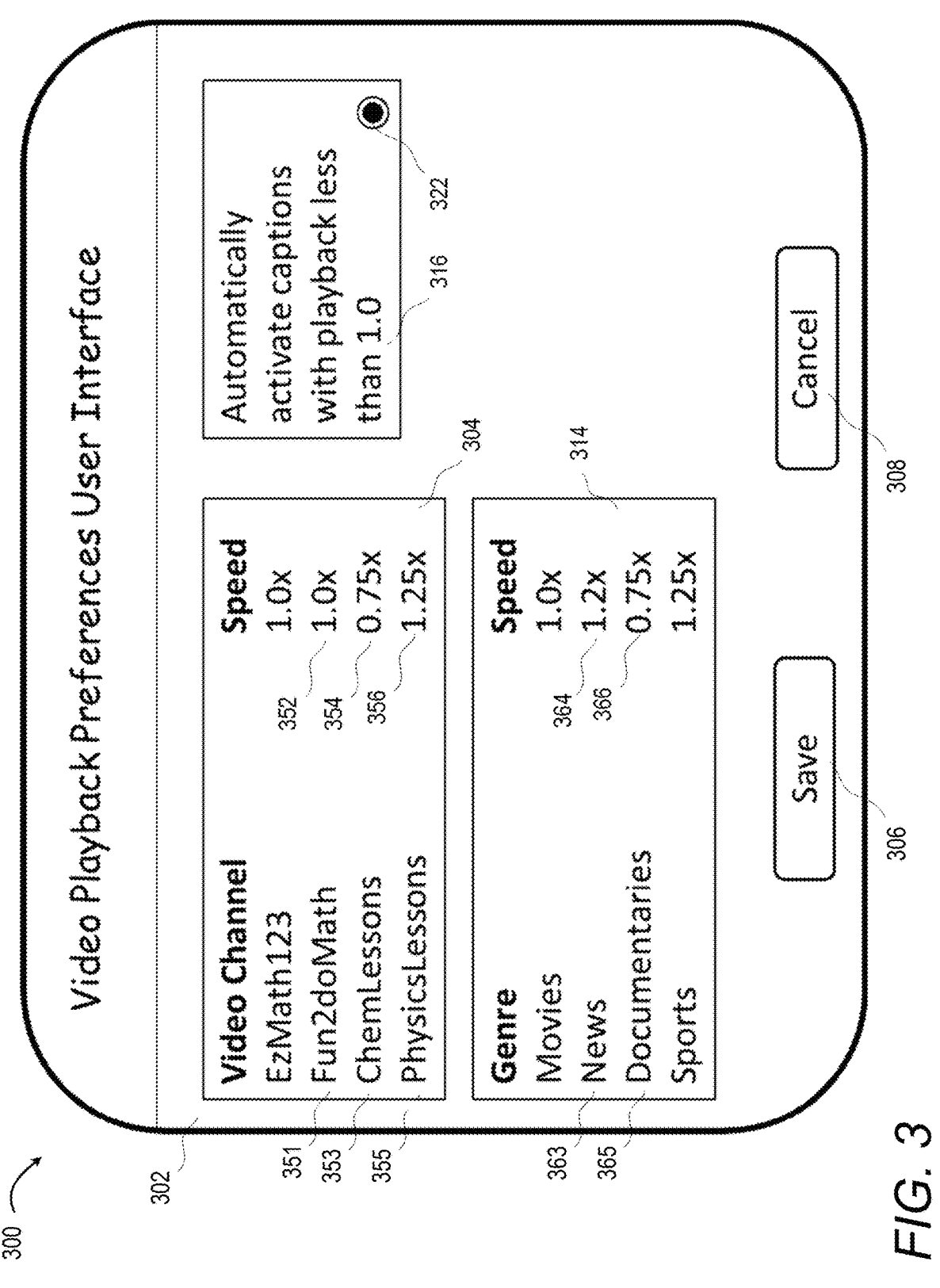
FIG. 3 depicts a user interface for establishing video playback preferences, according to one or more embodiments.

FIG. 3 depicts a user interface 300 for establishing video playback preferences, according to one or more embodiments. In one or more embodiments, the user interface shown in FIG. 3 may be rendered on a display 302 of a device such as device 100 of FIG. 1. In one or more embodiments, the user interface can be associated with (e.g., generated by) media player 154 on device 100. In one or more embodiments, the user interface can be generated at application server 280 and presented during user setup of playback features within online account 286. The user interface 300 includes a media source field 304, where a name of a given media source, along with a corresponding preferred playback rate can be specified. In the case of video streaming from a platform, the source provider can be indicated as a channel name, uniform resource locator (URL), and/or other designation. To further illustrate the specification of playback speed preferences, referring to additional details within media source field 304, a channel 'Fun2doMath' is specified at 351, and has a preferred playback speed of 1.0× as indicated at 352, indicating that content played from the Fun2doMath channel (media source) is to be played at its default (normal) playback speed. Similarly, a channel 'ChemLessons' is specified at 353, and has a preferred playback speed of 0.75× as indicated at 354, indicating that content played from the ChemLessons channel (media source) is to be played at a speed of 75 percent of the default (normal) playback speed. That is, playback of media assets from the ChemLessons channel are to be played back at a rate that is slower than the default playback speed. Similarly, a channel 'PhysicsLessons' is specified at 355, and has a preferred playback speed of 1.25× as indicated at 356, indicating that content played from the PhysicsLessons channel (media source) is to be played at a speed of 125 percent of the default (normal) playback speed. That is, playback of media assets from the PhysicsLessons channel are to be played back at a rate that is faster than the default playback speed.

The aforementioned examples are well-suited for consumption of educational content. In a scenario where a user is strong in the subject of physics, but less so in the subject of chemistry, the user can opt to play physics material at a faster than normal playback rate, to enable consuming the content more quickly. For example, a 40-minute physics video lesson can be consumed in 32 minutes at a rate of 1.25× (e.g., as indicated at 356) thereby saving time for a user in a case where the user can comprehend the subject material at the accelerated rate. Conversely, for a subject that is more challenging for a user (chemistry, in this example), the playback rate can be set slower than normal (e.g., as indicated at 354). Other topics (math, in this example), can be played at a default playback rate (e.g., as indicated at 352). Embodiments can include determining a topic for the media asset by retrieving metadata from the media asset (e.g., a source of the media asset); and computing the recommended playback rate, based at least in part on the determined topic. In one or more embodiments, where the metadata may not overtly indicate the topic, AI engine 105 (FIG. 1) can perform analysis of the speech produced by reply of the content to identify specific words and terminology that can be correlated to a specific topic utilizing a database of historical data or other user preferences data. Disclosed embodiments can automatically adjust the playback speed based on the media source, subject matter, and/or other criteria, creating a more enjoyable and fulfilling content consumption experience for a user.

A similar concept can be applied to a genre of content, as indicated in media genre field 314. Embodiments can include determining a genre for the media asset by retrieving metadata from the media asset; and computing the recommended playback rate, based at least in part on the determined genre. As an example, a genre of 'News' as indicated at 363 has a preferred playback speed of 1.2×, as indicated at 364. Similarly, a genre of 'Documentaries' as indicated at 365 has a preferred playback speed of 0.75×, as indicated at 366. One or more embodiments may further include a closed-caption option selection field 316 for an automatic activation of closed-caption for particular playback rates. In one or more embodiments, the option for automatic closed-caption may be activated via a radio button 322. When the radio button is set to on (as illustrated in FIG. 3), closedcaptioning may be automatically activated when a playback speed of less than the default (i.e., normal speed) is automatically set, based on the user preferences. Accordingly, even if the closed-caption is disabled on the device, in cases where a computed recommended playback rate is less than a default rate, the closed-captions are automatically activated during the playback of the media asset at the reduced rate. On playback of a subsequent media asset at a normal or faster rate, the closed-captions may then be automatically disabled again.

Once the media playback options are configured as desired, the Save button 306 can be invoked by a user. In one or more embodiments, in response to the invoking of the Save button 306, the preferences can be saved to onboard memory of the electronic device (e.g., 120 of FIG. 1), and/or saved remotely on an application server (e.g., 280 of FIG. 2). The user interface 300 can further include a cancel button 308, that when invoked, closes the user interface 300 without saving any changes.

Figure 4:
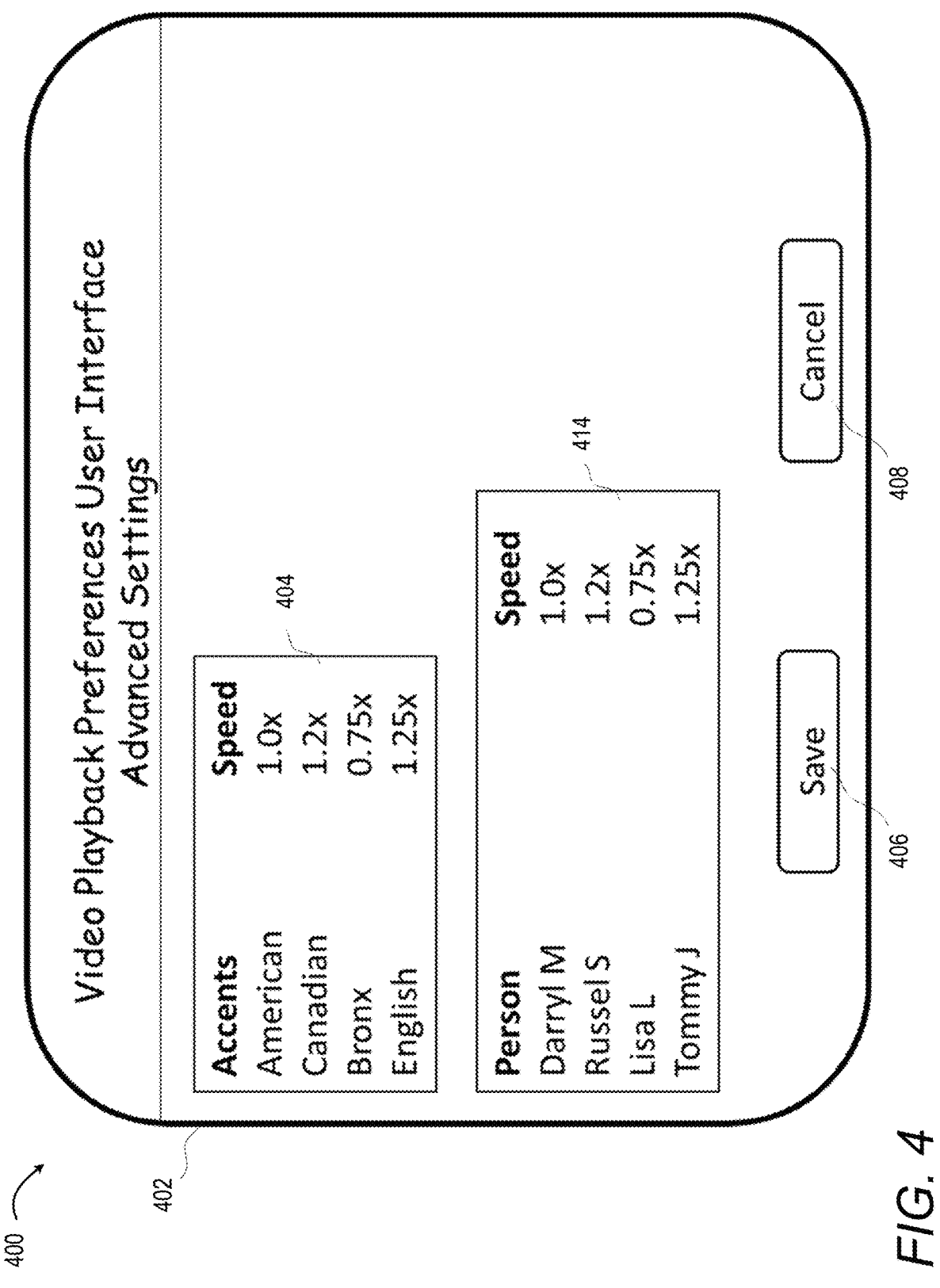
FIG. 4 depicts an additional user interface for establishing video playback preferences, according to one or more embodiments.

FIG. 4 depicts an additional user interface 400 for establishing video playback preferences, according to one or more embodiments. In one or more embodiments, the user interface shown in FIG. 4 may be rendered on a display 402 of a device such as device 100 of FIG. 1. The user interface 400 includes an accent field 404, where a detected speaker accent, along with a corresponding preferred playback rate can be specified. In one or more embodiments, the automatic identification of a speaker accent may be implemented using machine learning techniques as part of an automatic speech recognition (ASR) and speaker identification process, which involves analyzing audio signals to extract various features to identify the speaker's accent. The process can include feature extraction, in which a machine learning (ML) model analyzes acoustic features of speech, such as pitch, tone, rhythm, and intonation, which vary across different accents. The machine learning models used to implement features of disclosed embodiments may execute on artificial intelligence (AI) engines 105 of FIG. 1. Additionally, a phonetic analysis may be performed to identify differences in pronunciation of phonemes for further distinguishing between accents. The ML models may be tried using supervised learning and/or multi-class classification techniques. Embodiments may further perform speaker diarization (i.e., partitioning into homogeneous segments based on each of multiple speakers). For scenarios where multiple speakers are present, disclosed embodiments may separate the speech segments of each speaker before identifying their respective accents. Embodiments can include determining an accent of the speaker; comparing the determined accent of the speaker to an accent list in a user profile, each accent having an associated specified rate relative to a normal playback rate; and in response to the determined accent being included in the accent list, adjusting the recommended playback rate based on the associated specified rate for the determined accent.

The user interface 400 includes a speaker identity field 414, where a detected speaker, along with a corresponding preferred playback rate can be specified. Embodiments can include identifying a person in the video file, and adjusting the recommended playback rate based on the identified person. One or more embodiments can perform speaker identification and set a playback rate for media in response to detecting that a user preference exists for a given speaker. One or more embodiments may utilize machine learning (ML) models to analyze specific characteristics of a person's voice, such as pitch, timbre, cadence, and pronunciation. These features are unique to each individual. One or more embodiments may further analyze Mel-Frequency Cepstral Coefficients (MFCCs). MFCCs represent the short-term power spectrum of a sound and are effective in capturing the unique aspects of a speaker's voice. The user interface 400 further includes a save button 406 and a cancel button 408 that operate similar to as described in FIG. 3. In one or more embodiments, when multiple parameters indicate different playback speeds, the lowest indicated playback speed is used. As an example, if the genre of a media asset is associated with a playback speed of 0.9×, and the detected accent of the speaker in the media asset is associated with a playback speed of 0.8×, then the lowest playback speed of 0.8× is used.

Figure 5:
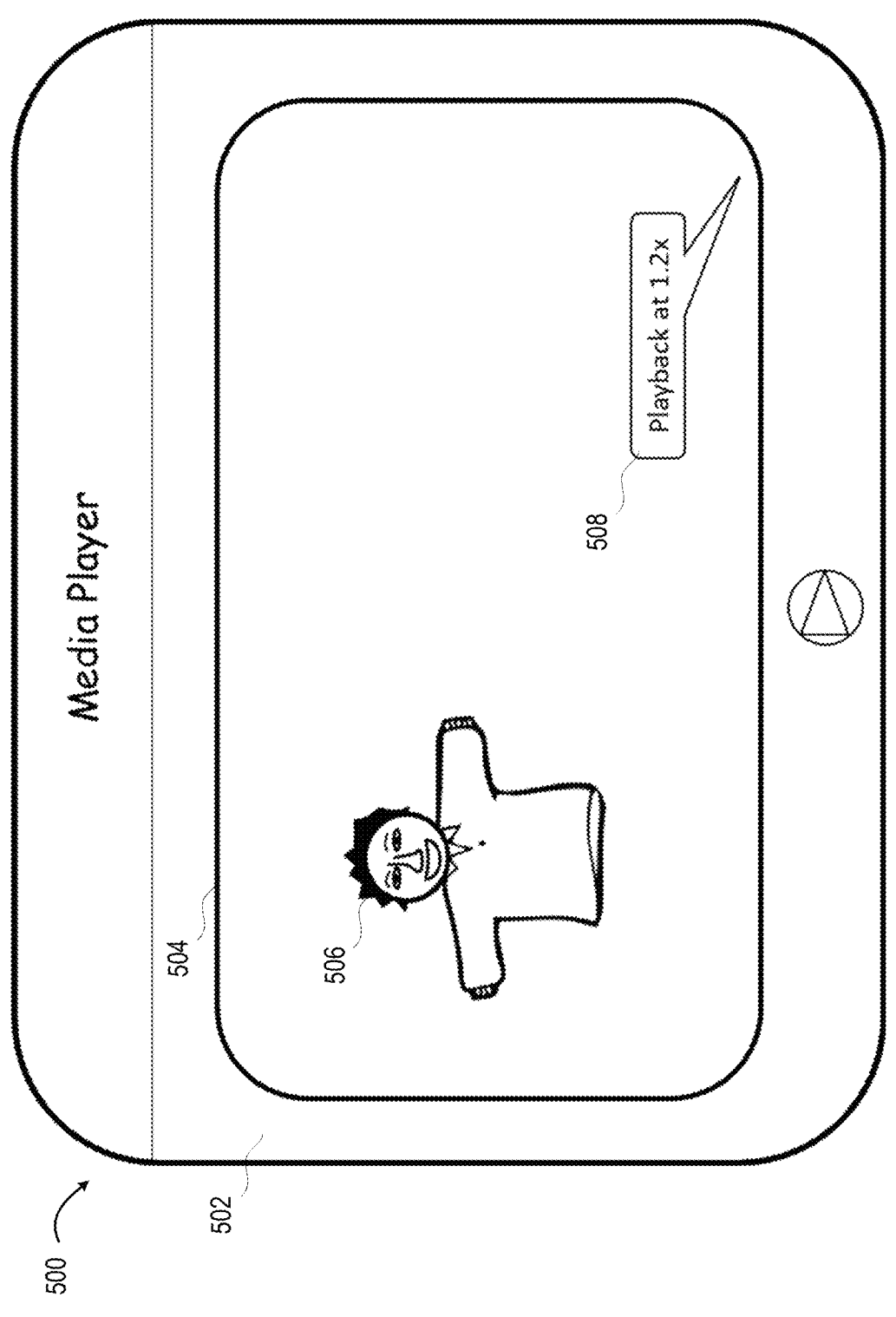
FIG. 5 depicts accelerated media playback based on the identified speaker and/or type of media content, according to one or more embodiments.

FIG. 5 depicts a user interface 500 indicating accelerated media playback based on the identified speaker and/or type of media content, according to one or more embodiments. In one or more embodiments, the user interface shown in FIG. 5 may be rendered on a display 502 of a device such as device 100 of FIG. 1. The user interface 500 includes a video window 504, which renders video, including video of a speaker 506. The speaker 506 can be providing instruction, narration, and/or other types of verbally-presented information. Based on user preferences, such as those specified in FIG. 3 and/or FIG. 4, a playback rate may be automatically adjusted, as indicated at 508. In one or more embodiments, the default (normal) rate may be the playback rate at which the content was created or recorded. The feature of automatically speeding up the playback rate under certain conditions is useful for speakers that tend to speak slowly, and/or have lengthy pauses in between words and/or sentences, thus generating a bursty pattern of speech. Accordingly, one or more embodiments can include determining a burstiness level of the speech, based on identifying an average duration of silence between one or more words spoken by the speaker; and in response to the burstiness level exceeding a predetermined threshold, increasing the recommended playback rate. As shown at 508, in this example, the playback rate is increased to 1.2×, thus playing back the video at a faster rate than the default (normal) rate.

Figure 6:
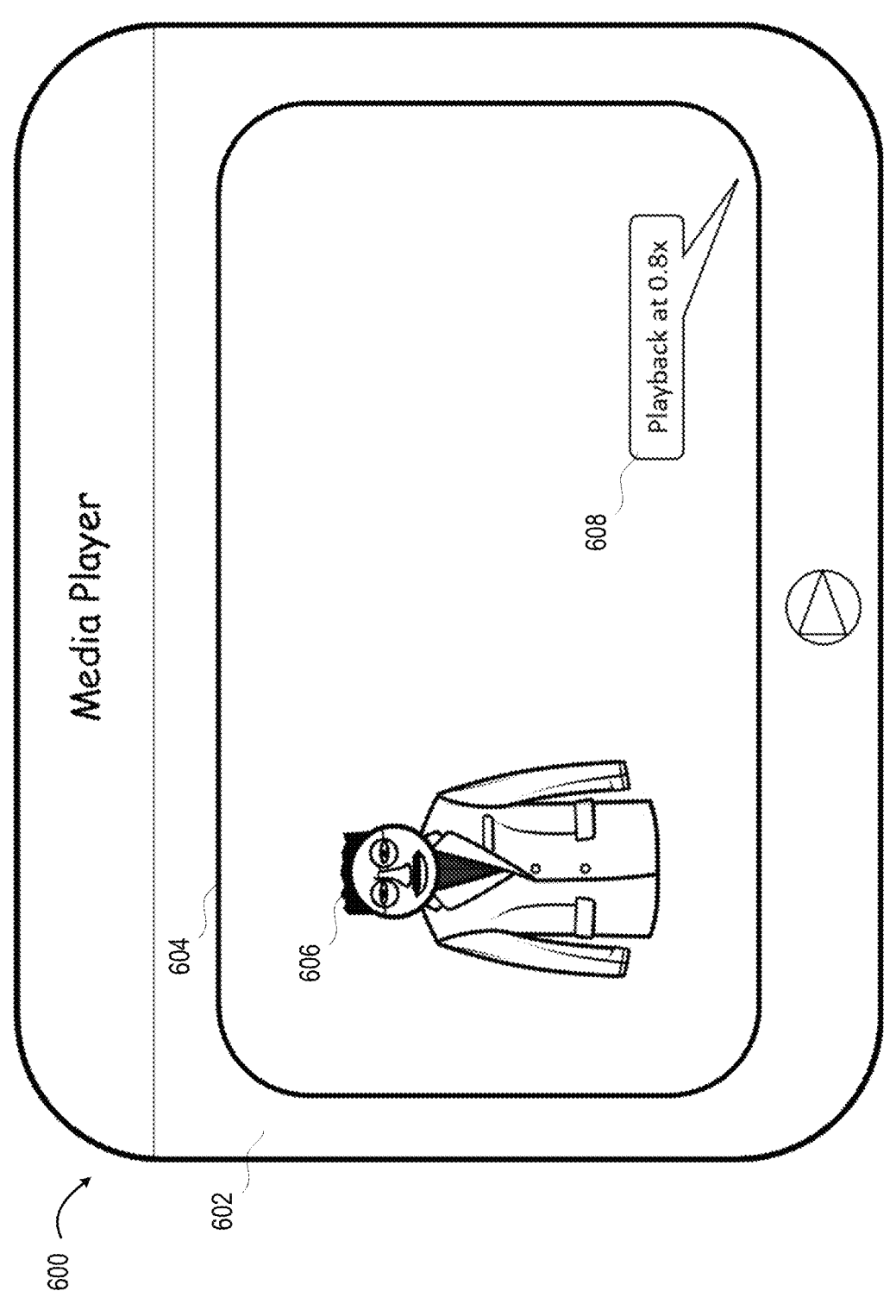
FIG. 6 depicts reduced speed media playback based on the identified speaker and/or type of media content, according to one or more embodiments.

FIG. 6 depicts a user interface 600 indicating reduced speed media playback based on the identified speaker and/or type of media content, according to one or more embodiments. In one or more embodiments, the user interface shown in FIG. 6 may be rendered on a display 602 of a device such as device 100 of FIG. 1. The user interface 600 includes a video window 604, which renders video, including video of a speaker 606. The speaker 606 can be providing instruction, narration, and/or other types of information. Based on user preferences, such as those specified in FIG. 3 and/or FIG. 4, a playback rate may be automatically adjusted, as indicated at 608. As shown at 608, in this example, the playback rate is reduced to 0.8×, thus playing back at a slower rate than the default (normal) rate. The feature of automatically reducing the playback rate under certain conditions is useful for speakers that tend to speak quickly, speak with an accent that the user has difficulty understanding, and/or are speaking about a complex or hard-to-understand topic.

Figure 7:
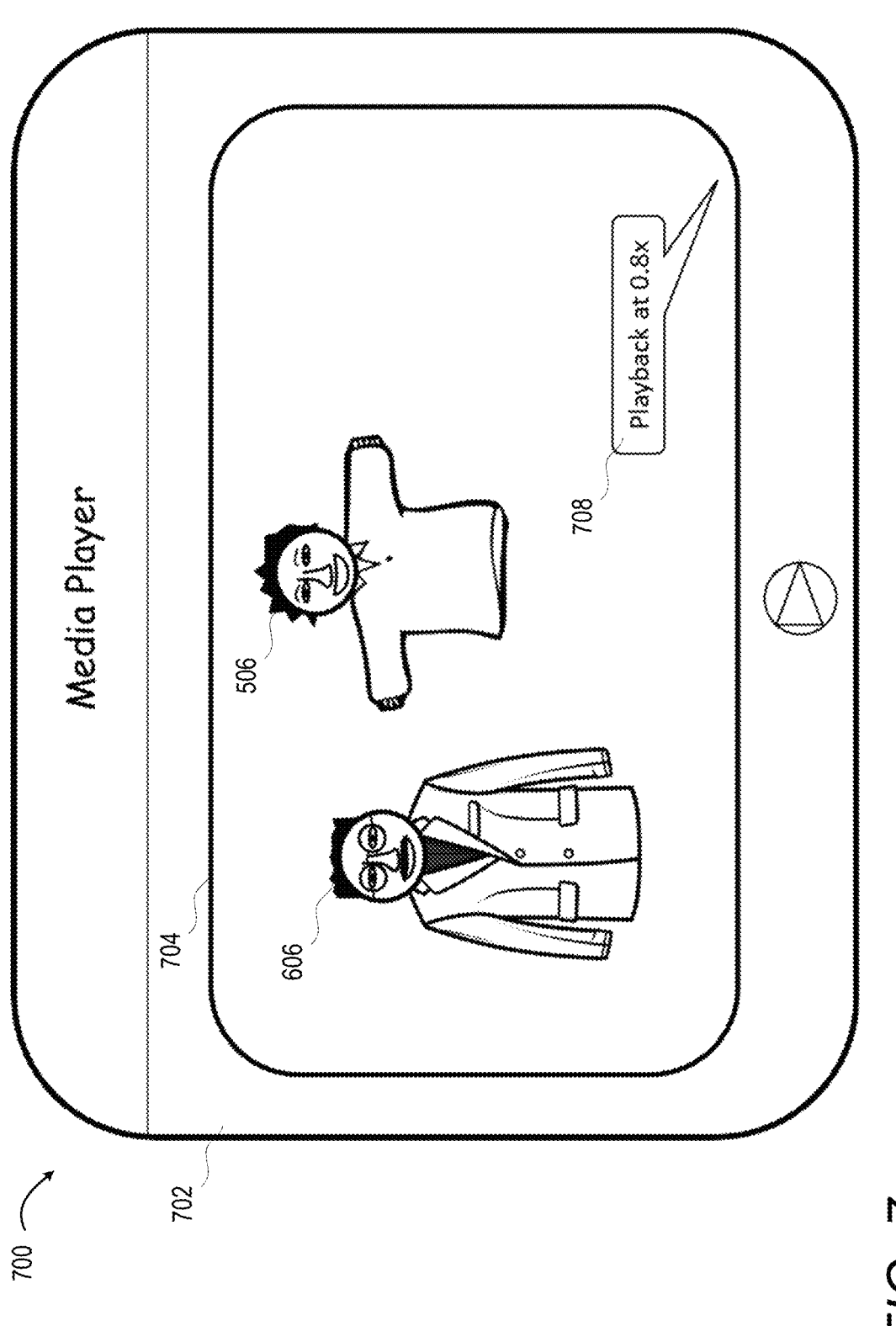
FIG. 7 depicts selectively setting an operating playback rate of the media player to the lowest recommended playback speed for playback involving multiple speakers, according to one or more embodiments.

FIG. 7 depicts a user interface 700 illustrating selectively setting an operating playback rate of the media player to the lowest recommended playback speed for playback involving multiple speakers, according to one or more embodiments. In one or more embodiments, the user interface shown in FIG. 7 may be rendered on a display 702 of a device such as device 100 of FIG. 1. The user interface 700 includes a video window 704, which renders video, including video of two speakers, indicated at 506, and 606. Referring again to FIG. 5, the example user preferences for speaker 506 are to accelerate the playback to 1.2× (as shown at 508 in FIG. 5). Referring again to FIG. 6, the example user preferences for speaker 606 are to reduce the playback to 0.8× (as shown at 608 in FIG. 6). However, in the scenario depicted in FIG. 7, both speaker 506 and speaker 606 are present in the video. As an example, the video can include a back-and-forth discussion between speaker 506 and speaker 606. In one or more embodiments, when multiple speakers are present, and the recommended playback rates for the multiple speakers differ, the lowest recommended playback speed is used for playback of the media asset, as indicated at 708. Embodiments can include analyzing the audio data of recorded speech of a second speaker to determine one or more speech parameters of the second speaker; computing a second recommended playback rate, based at least in part on the playback rate preferences and the one or more speech parameters of the second speaker; setting an operating playback rate of the media player to the lower of the recommended playback rate and the second recommended playback rate; and rendering the media asset at the operating playback rate, using the media player.

Figure 8:
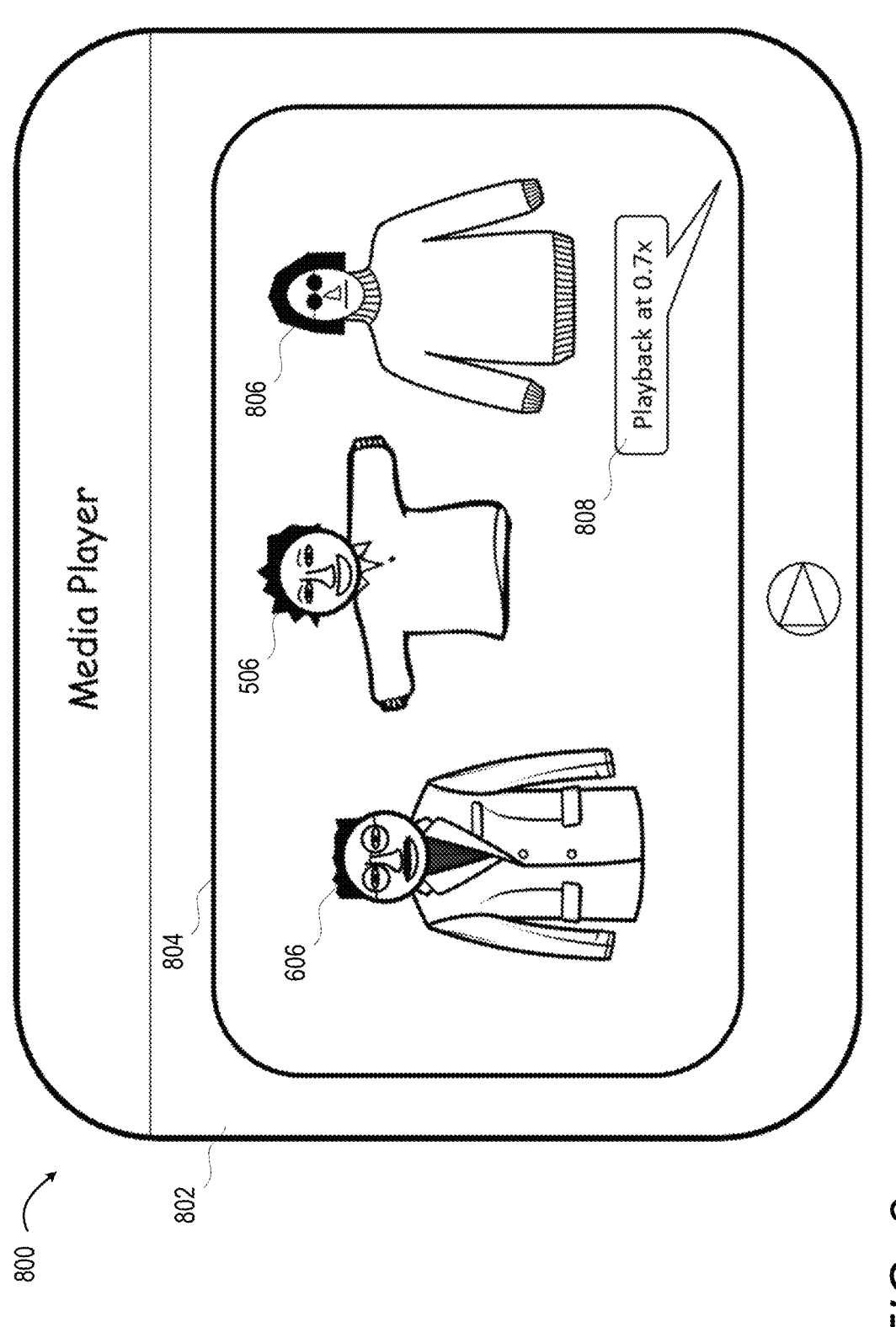
FIG. 8 depicts automatic adjustment of the recommended playback speed from the example of FIG. 7, based on identifying a change in the people speaking in a video, according to one or more embodiments.

FIG. 8 depicts a user interface 800 illustrating automatic adjustment of the recommended playback speed from the example of FIG. 7, based on identifying a change in the people speaking in a video, according to one or more embodiments. In one or more embodiments, the user interface shown in FIG. 8 may be rendered on a display 802 of a device such as device 100 of FIG. 1. The user interface 800 includes a video window 804, which renders video, including video of two speakers, indicated at 506 and 606, along with another individual, indicated at 806 that is not currently speaking. In one or more embodiments, the playback rate can be adjusted based on the detection of presence of the newest arriving speaker, individual 806. One or more embodiments may utilize ML-based facial recognition and facial identification to determine the identity of the individual, and adjust a playback rate based on the presence of the individual, even if the individual has not spoken. These embodiments enable a playback speed to be preset, based on the presence of a specific individual whose identity is known. In this way, if or when the individual does speak, the playback speed is already set to the user-preferred playback rate. In the example shown in FIG. 8, the individual 806 has an associated playback rate of 0.7× established. Accordingly, as indicated at 808, the playback rate of the video is set to 0.7×, which is the lowest recommended playback speed, compared with the playback speeds corresponding to speaker 506 and speaker 606. Embodiments can include identifying a person in a video file within the media asset and adjusting the playback rate based on the identified person.

Figure 9:
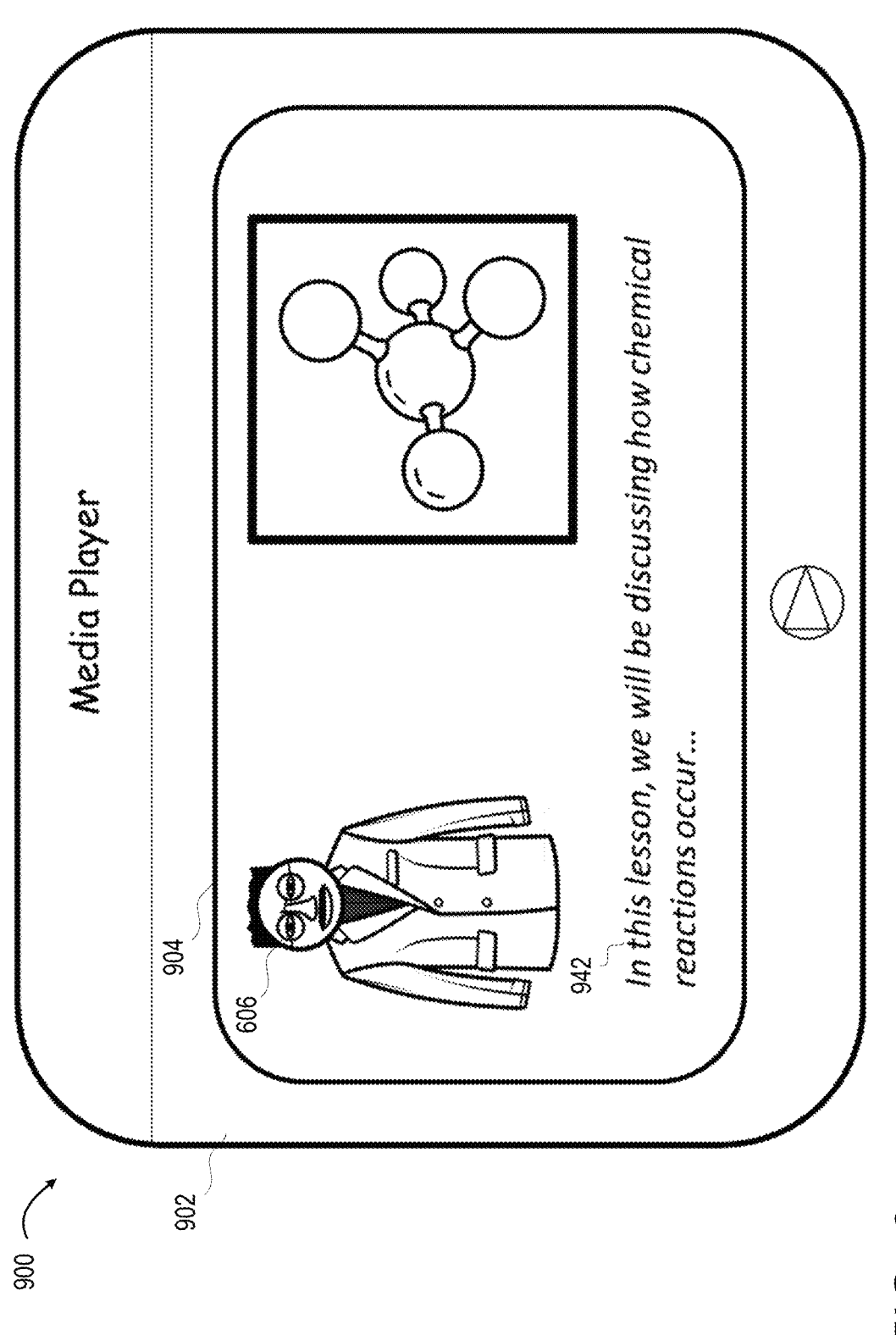
FIG. 9 depicts automatic activation of closed caption based on a recommended playback rate for the media content being presented, according to one or more embodiments.

FIG. 9 depicts a user interface 900 illustrating automatic activation of closed caption based on a recommended playback rate for the media content being presented, according to one or more embodiments. In one or more embodiments, the user interface shown in FIG. 9 may be rendered on a display 902 of a device such as device 100 of FIG. 1. The user interface 900 includes a video window 904, which includes speaker 606. Continuing from the example shown in FIG. 6, the playback speed is set to 0.8×, as indicated at 608 of FIG. 6. In the example shown in FIG. 9, the automatic closed-caption activation option is enabled (refer to 316 of FIG. 3). Accordingly, captions 942 are automatically rendered for the media asset. In one or more embodiments, the captions can be included in metadata for the asset, such as a subtitle track. In one or more embodiments, the captions can be decoded on-the-fly using real-time speech recognition. One or more embodiments may utilize a search algorithm such as the Viterbi algorithm to find the most likely sequence of words given the acoustic signals and language model probabilities. Additionally, disclosed embodiments may utilize incremental transcription techniques, which continuously updates and refines the transcription as more audio data becomes available. The incremental transcription techniques can enable improved disambiguation processing. Disambiguation in Automatic Speech Recognition (ASR) is crucial because it directly affects the accuracy and reliability of transcriptions. Ambiguity arises in speech recognition due to homophones, context variations, accents, background noise, and other factors. Disambiguation ensures that the recognized text correctly represents the intended meaning of the spoken words. For example, homophones (words that sound the same, but have different meanings) can be distinguished through context analysis (e.g., "their" versus "there," "I" versus "eye," etc.).

Automatically activating captions on videos on which the user prefers reduced playback speed offers numerous benefits for aiding comprehension, making content more accessible and enhancing the viewing experience for the user. Thus, the disclosed embodiments can assist with understanding speech of a person whose audible speech can be difficult to comprehend or whose speech covers complex terminology that the listener may not be familiar with or able to grasp from listening to the slowed audio. Additionally, disclosed embodiments can assist non-native speakers to understand content better by enabling the user to read along with the audio for media assets that they may have difficulty comprehending. Moreover, exposure to written words can help in learning new vocabulary and improving language proficiency, thereby improving overall understanding.

Figure 11:
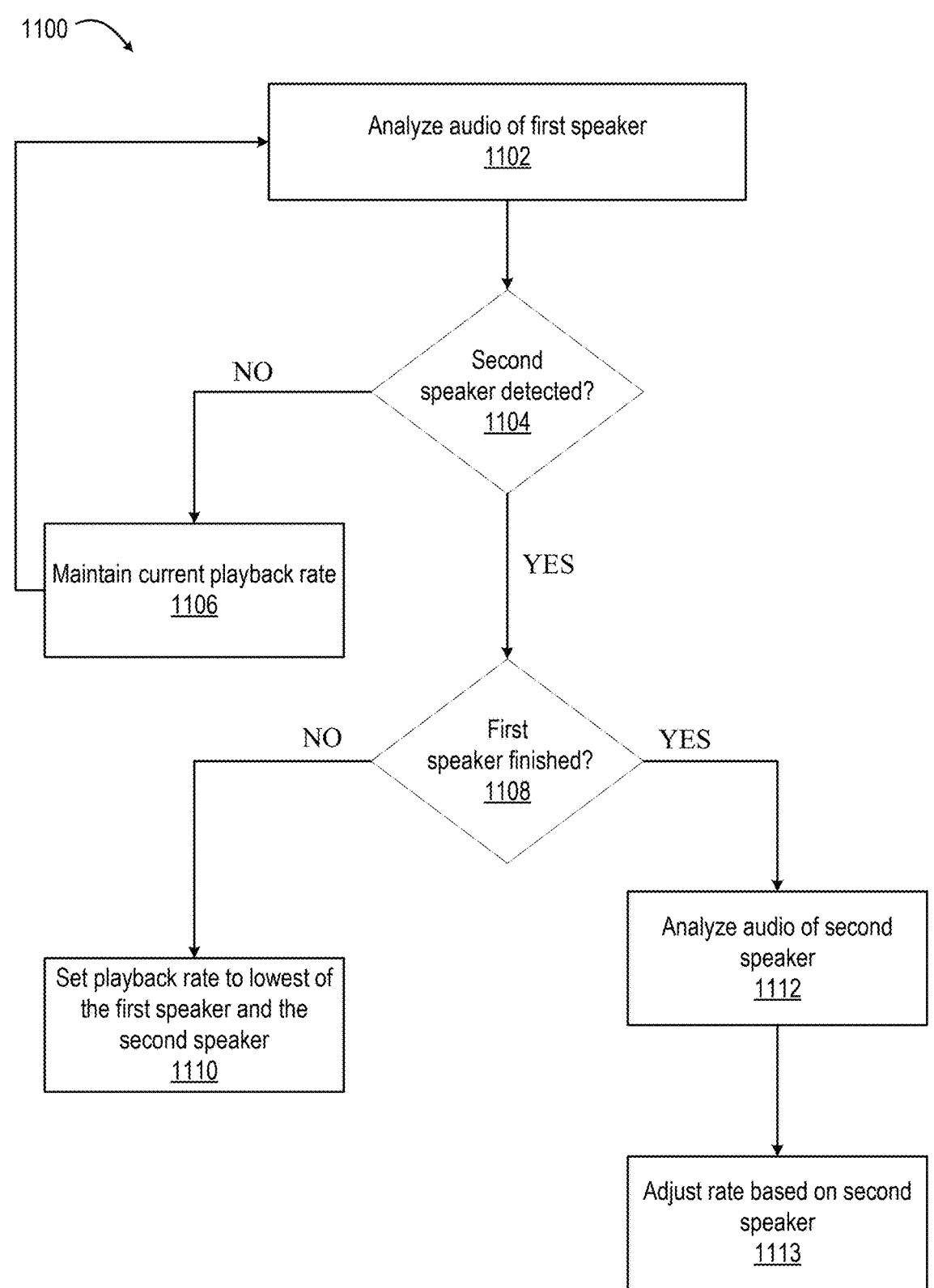
FIG. 11 depicts a flowchart of a computer-implemented method for adjusting a playback rate based on detecting a change in the person speaking in a media asset, according to one or more embodiments.

Referring now to the flowcharts presented by FIG. 10 and FIG. 11, the descriptions of the methods shown by FIG. 10 and FIG. 11 are provided with general reference to the specific components and features illustrated within the preceding FIGS. 1-9. Specific components referenced in the methods of FIG. 10 and FIG. 11 may be identical or similar to components of the same name used in describing preceding FIGS. 1-9. In one or more embodiments, processor 102 (FIG. 1) configures electronic device 100 (FIG. 1) to provide the described functionality of the methods of FIG. 10 and FIG. 11 by executing program code for one or more modules or applications provided within system memory 120 of electronic device 100, including SA module 152 and media player 154, utilizing user preferences data from preferences database 157 (FIG. 1).

FIG. 10 depicts a flowchart of a computer-implemented method 1000 for dynamically adapting a media playback rate, according to one or more embodiments. The method 1000 starts at block 1002, where one or more playback rate preferences are obtained for a user. In one or more embodiments, the playback rate preferences can be specified via a user interface such as depicted in FIG. 3 and/or FIG. 4. The method 1000 further includes obtaining audio data of recorded speech of a speaker in a media asset at block 1004. The media asset can be an audio asset. The media asset can be a video asset. The media asset can be a multimedia (i.e., combined audio and video) asset. The audio data can include spoken words in a single language or in a wide variety of languages. Many other characteristics of the audio data are supported. The method 1000 further includes analyzing the audio to determine one or more speech parameters at block 1006. The speech parameters can include a speech rate. The speech rate can include an average number of words per minute or other suitable measure of speech rate. The speech parameters can include an accent, dialect, or other regional speech variations. The speech parameters can include additional information, such as the topic being discussed, source of the speech (e.g., the channel, broadcaster, studio, etc.), genre of the media asset, the identity of the person speaking, and/or other speech parameters. Embodiments can include determining an average word rate of the speaker, where the average word rate indicates an average number of words per minute (or per other time variable) spoken by the speaker.

The method 1000 further includes computing, at block 1008, a recommended playback rate based at least in part on the playback rate preferences and the one or more speech parameters. The detected speech parameters can be compared with the user-preferences. As an example, referring to 314 of FIG. 3, if the genre of the media asset is determined to be a documentary (e.g., based on metadata of the media asset and/or ML-based classifications), as indicated at 365, then the corresponding rate of 0.75 (as indicated at 366) can be automatically set as the playback rate. The method 1000 further includes setting a playback rate of a media player to the recommended playback rate at block 1010. The setting of a playback rate can include using an API (application programming interface) to change the speed of a media player. As an example, for a media player utilizing the GStreamer framework, the playback rate of a stream may be altered using the pitch element, which enables adjusting of the pitch and speed of audio independently. The method 1000 further includes automatically rendering the media asset at the recommended playback rate at block 1012. Accordingly, disclosed embodiments can automatically adjust playback rate of a media asset by analyzing the media asset for one or more parameters and identifying and/or computing user-preferred playback rates corresponding to the one or more parameters.

FIG. 11 depicts a flowchart of a computer-implemented method 1100 for adjusting a playback rate based on detecting a change in the person speaking in a media asset, according to one or more embodiments. The method 1100 starts at block 1102, where audio of a first speaker is analyzed. The analysis can include identifying parameters similar to as described for block 1006 of FIG. 10. The method 1100 continues to block 1104, where a check is made to determine if a second (different) speaker is detected. In one or more embodiments, ML-based models are configured/trained to analyze unique characteristics of a person's voice, such as pitch, tone, and pronunciation, to identify and differentiate between different speakers. If a second speaker is detected at block 1104, the method continues to block 1108, where a check is made to determine if the first speaker is finished speaking. In one or more embodiments, when the voice of the first speaker is not detected for a duration exceeding a predetermined threshold (e.g., 60 seconds), the first speaker is considered to be finished speaking. This scenario can occur at a conference, where multiple speakers speak sequentially. If, at block 1108, the first speaker is determined to be finished speaking, then the method 1100 continues to block 1112, where audio of the second speaker is analyzed to determine a corresponding second playback rate, based on the parameters of the second speaker's speech and the user preferences. At block 1113, assuming the determined second playback rate is different from the first playback rate, the playback rate of the media asset may be adjusted to the second playback rate associated with the second speaker. If, at block 1108, the first speaker is determined to not be finished, then the method 1100 continues to block 1110, where the playback rate is set to the lower of the recommended playback rate for the first speaker and the recommended playback rate for the second speaker. This scenario can occur during a roundtable discussion, where multiple speakers speak, interspersed in a conversational manner. For example, the first speaker may speak for ten seconds, followed by the second speaker speaking for 20 seconds, followed again by the first speaker speaking for eight seconds, and so on. If a second speaker is not detected at block 1104, the method continues to block 1106, where the current playback rate is maintained. The method 1100 may periodically return to block 1102 to repeat various steps of method 1100 as the media asset continues to play. Accordingly, one or more embodiments can include: monitoring presentation of the audio data and determining that audio data of recorded speech of the speaker in the media asset has completed; obtaining subsequent audio data of recorded speech of a second speaker in the media asset; analyzing the audio data of recorded speech of the second speaker to determine one or more speech parameters of the second speaker; computing a second recommended playback rate, based at least in part on the playback rate preferences and the one or more speech parameters of the second speaker; setting the playback rate of the media player to the second recommended playback rate; and rendering the subsequent audio data of the media asset at the second recommended playback rate, using the media player.

As can now be appreciated, disclosed embodiments provide techniques for dynamically adapting a media playback rate based on user preferences and detected speech parameters. Dynamically adjusting audio playback speed based on user-preferences and detected speech parameters can provide a range of benefits for understanding spoken content, offering a more personalized and efficient learning experience. For educational, accessibility, or personal reasons, the feature of automatically and dynamically adjusting media asset playback speed can significantly enhance the comprehension and enjoyment of audio and video content.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
   at least one output device, including an audio output device;
   a memory having stored thereon a speaker analysis (SA) module and a multimedia playback module; and
   at least one processor communicatively coupled to the audio output device and the memory, the at least one processor executing program code of the SA module and multimedia playback module, and is configured to cause the electronic device to:
      obtain one or more playback rate preferences for a user;
      obtain audio data of recorded speech of a speaker in a media asset;
      analyze the audio data to determine one or more parameters from among a genre for the media asset, a topic for the media asset, an accent of the speaker, and a burstiness level of the audio data;
      compute a recommended playback rate, based at least in part on the playback rate preferences and the one or more parameters;
      set a playback rate of a media player to the recommended playback rate; and
      render the media asset at the recommended playback rate, using the media player.

2. The electronic device of claim 1, wherein further the at least one processor:
   determines the genre for the media asset by retrieving metadata from the media asset; and
   computes the recommended playback rate, based at least in part on the determined genre.

3. The electronic device of claim 1, wherein further the at least one processor:
   determines the topic for the media asset by retrieving metadata from the media asset; and
   computes the recommended playback rate, based at least in part on the determined topic.

4. The electronic device of claim 1, wherein the one or more speech parameters comprises and average word rate of the speaker, and the at least one processor determines an average word rate of the speaker, wherein the average word rate indicates an average number of words per minute spoken by the speaker.

5. The electronic device of claim 1, wherein the parameters are speech parameters comprising the accent of the speaker, and the at least one processor:
   analyzes the audio data to determine the accent of the speaker;
   compares the determined accent of the speaker to an accent list in a user profile, each accent having an associated specified rate relative to a normal playback rate; and in response to the determined accent being included in the accent list, adjust the recommended playback rate based on the associated specified rate for the determined accent.

6. The electronic device of claim 1, wherein the parameters are speech parameters comprising the burstiness level, and the at least one processor:

determines the burstiness level of the audio data based on identifying an average duration of silence between one or more words spoken by the speaker; and in response to the burstiness level exceeding a predetermined threshold, increases the recommended playback rate.

7. The electronic device of claim 1, wherein the media asset comprises audio data from a plurality of speakers, wherein the plurality of speakers includes at least the speaker and a second speaker, and the at least one processor:

monitors presentation of the audio data and determines that audio data of recorded speech of the speaker in the media asset has completed;

obtains audio data of recorded speech of the second speaker in the media asset;

analyzes the audio data of recorded speech of the second speaker to determine one or more speech parameters of the second speaker;

computes a second recommended playback rate, based at least in part on the one or more playback rate preferences and the one or more speech parameters of the second speaker;

sets the playback rate of the media player to the second recommended playback rate; and renders the audio data of the media asset at the second recommended playback rate, using the media player.

8. The electronic device of claim 1, wherein further the at least one processor:

obtains audio data of recorded speech of a second speaker in the media asset;

analyzes the audio data of recorded speech of the second speaker to determine one or more speech parameters of the second speaker;

computes a second recommended playback rate, based at least in part on the one or more playback rate preferences and the one or more speech parameters of the second speaker;

sets an operating playback rate of the media player to a lower of the recommended playback rate and the second recommended playback rate; and renders the media asset at the operating playback rate, using the media player.

9. The electronic device of claim 1, wherein the media asset includes a video file, and wherein further the at least one processor:

identifies a person in the video file, and adjusts the recommended playback rate based on the identified person.

10. A method comprising:

obtaining, by a processor of an electronic device that comprises a media player, one or more playback rate preferences for a user;

obtaining audio data of recorded speech of a speaker in a media asset;

analyzing the audio data to determine one or more parameters from among a genre for the media asset, a topic for the media asset, an accent of the speaker, and a burstiness level of the audio data;

computing a recommended playback rate, based at least in part on the playback rate preferences and the one or more parameters;

setting a playback rate of a media player to the recommended playback rate; and rendering the media asset at the recommended playback rate, using the media player.

11. The method of claim 10, further comprising:

determining the genre for the media asset by retrieving metadata from the media asset; and computing the recommended playback rate, based at least in part on the determined genre.

12. The method of claim 10, further comprising:

determining the topic for the media asset by retrieving metadata from the media asset; and computing the recommended playback rate, based at least in part on the determined topic.

13. The method of claim 10, further comprising determining an average word rate of the speaker, wherein the average word rate indicates an average number of words per minute spoken by the speaker.

14. The method of claim 10, further comprising:

determining the accent of the speaker;

comparing the determined accent of the speaker to an accent list in a user profile, each accent having an associated specified rate relative to a normal playback rate; and in response to the determined accent being included in the accent list, adjusting the recommended playback rate based on the associated specified rate for the determined accent.

15. The method of claim 10, further comprising:

determining the burstiness level based on identifying an average duration of silence between one or more words spoken by the speaker; and in response to the burstiness level exceeding a predetermined threshold, increasing the recommended playback rate.

16. The method of claim 10, further comprising:

monitoring presentation of the audio data and determining that audio data of recorded speech of the speaker in the media asset has completed;

obtaining subsequent audio data of recorded speech of a second speaker in the media asset;

analyzing the audio data of recorded speech of the second speaker to determine one or more speech parameters of the second speaker;

computing a second recommended playback rate, based at least in part on the one or more playback rate preferences, and the one or more speech parameters of the second speaker;

setting the playback rate of the media player to the second recommended playback rate; and rendering the subsequent audio data of the media asset at the second recommended playback rate, using the media player.

17. The method of claim 10, further comprising:

analyzing the audio data of recorded speech of a second speaker to determine one or more speech parameters of the second speaker;

computing a second recommended playback rate, based at least in part on the one or more playback rate preferences and the one or more speech parameters of the second speaker;

setting an operating playback rate of the media player to a lower of the recommended playback rate and the second recommended playback rate; and rendering the media asset at the operating playback rate, using the media player.

18. The method of claim 10, further comprising:

identifying a person in a video file within the media asset, and adjusting the recommended playback rate based on the identified person.

19. A computer program product comprising a non-transitory computer readable medium having program instructions that when executed by a processor of an electronic device comprising an audio output device and a media player, configure the electronic device to perform functions comprising:

obtaining one or more playback rate preferences for a user;

obtaining audio data of recorded speech of a speaker in a media asset;

analyzing the audio data to determine one or more parameters from among a genre for the media asset, a topic for the media asset, an accent of the speaker, and a burstiness level of the audio data;

computing a recommended playback rate, based at least in part on the one or more playback rate preferences and the one or more parameters;

setting a playback rate of a media player to the recommended playback rate; and rendering the media asset at the recommended playback rate, using the media player.

20. The computer program product of claim 19, further comprising program instructions for:

monitoring presentation of the audio data and determining that audio data of recorded speech of the speaker in the media asset has completed;

obtaining subsequent audio data of recorded speech of a second speaker in the media asset;

analyzing the audio data of recorded speech of the second speaker to determine one or more speech parameters of the second speaker;

computing a second recommended playback rate, based at least in part on the one or more playback rate preferences, and the one or more speech parameters of the second speaker;

setting the playback rate of the media player to the second recommended playback rate; and rendering the subsequent audio data of the media asset at the second recommended playback rate, using the media player.

\* \* \* \* \*